United States Patent
Pfankuch

(10) Patent No.: US 7,017,733 B2
(45) Date of Patent: Mar. 28, 2006

(54) DRIVER, ESPECIALLY FOR USE IN COLLECTING AND PACKAGING MACHINES

(75) Inventor: Claus Karl Pfankuch, Hamburg (DE)

(73) Assignee: Pfankuch Maschinen GmbH, Ahrensburg (DE)

( * ) Notice: Subject to any disclaimer, the term of this patent is extended or adjusted under 35 U.S.C. 154(b) by 57 days.

(21) Appl. No.: 10/860,164

(22) Filed: Jun. 3, 2004

(65) Prior Publication Data

US 2004/0245717 A1 Dec. 9, 2004

(30) Foreign Application Priority Data

Jun. 6, 2003 (DE) .......................... 203 08 865 U

(51) Int. Cl.
*B65G 19/24* (2006.01)

(52) U.S. Cl. ..................................... 198/731

(58) Field of Classification Search ........ 198/731–733, 198/726, 734, 469.1

See application file for complete search history.

(56) References Cited

U.S. PATENT DOCUMENTS

| 2,861,677 | A | | 11/1958 | van Marle | |
|---|---|---|---|---|---|
| 3,960,263 | A | * | 6/1976 | Isaksson et al. | 198/718 |
| 5,165,523 | A | | 11/1992 | Wooley et al. | |
| 5,711,412 | A | * | 1/1998 | Gysin et al. | 198/732 |
| 5,964,461 | A | * | 10/1999 | Ende et al. | 271/271 |
| 6,378,693 | B1 | * | 4/2002 | Ballestrazzi et al. | 198/732 |

FOREIGN PATENT DOCUMENTS

| DE | 3634712 | 5/1987 |
|---|---|---|
| EP | 0474973 | 3/1992 |
| EP | 0906882 | 4/1999 |
| EP | 1086911 | 3/2001 |
| EP | 0906882 | 12/2003 |
| FR | 2408996 | 6/1979 |

* cited by examiner

*Primary Examiner*—Richard Ridley
(74) *Attorney, Agent, or Firm*—Friedrich Kueffner

(57) ABSTRACT

A driver for use in collecting and packaging machines has a base member securable on a transport system. A drive lever is arranged pivotably on the base member so as to pivot at least between a swung-out drive position and a folded safety position. A spring element acts on the drive lever. The spring element, in the drive position of the drive lever, secures by a spring force the drive lever in the drive position but releases the drive lever, when a first counterforce surpassing the spring force acts on the drive lever, for pivoting the drive lever from the drive position into the safety position.

11 Claims, 3 Drawing Sheets

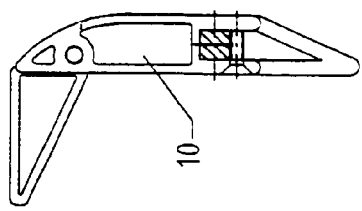
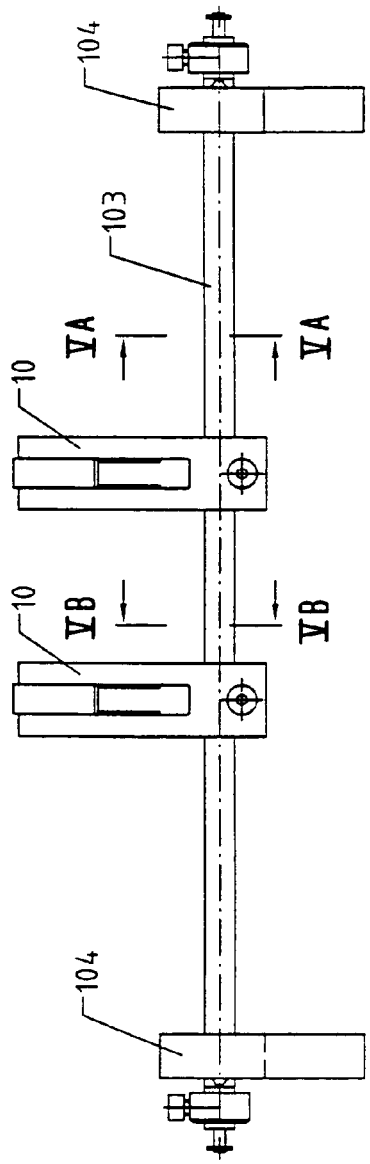
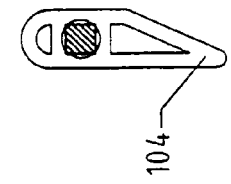

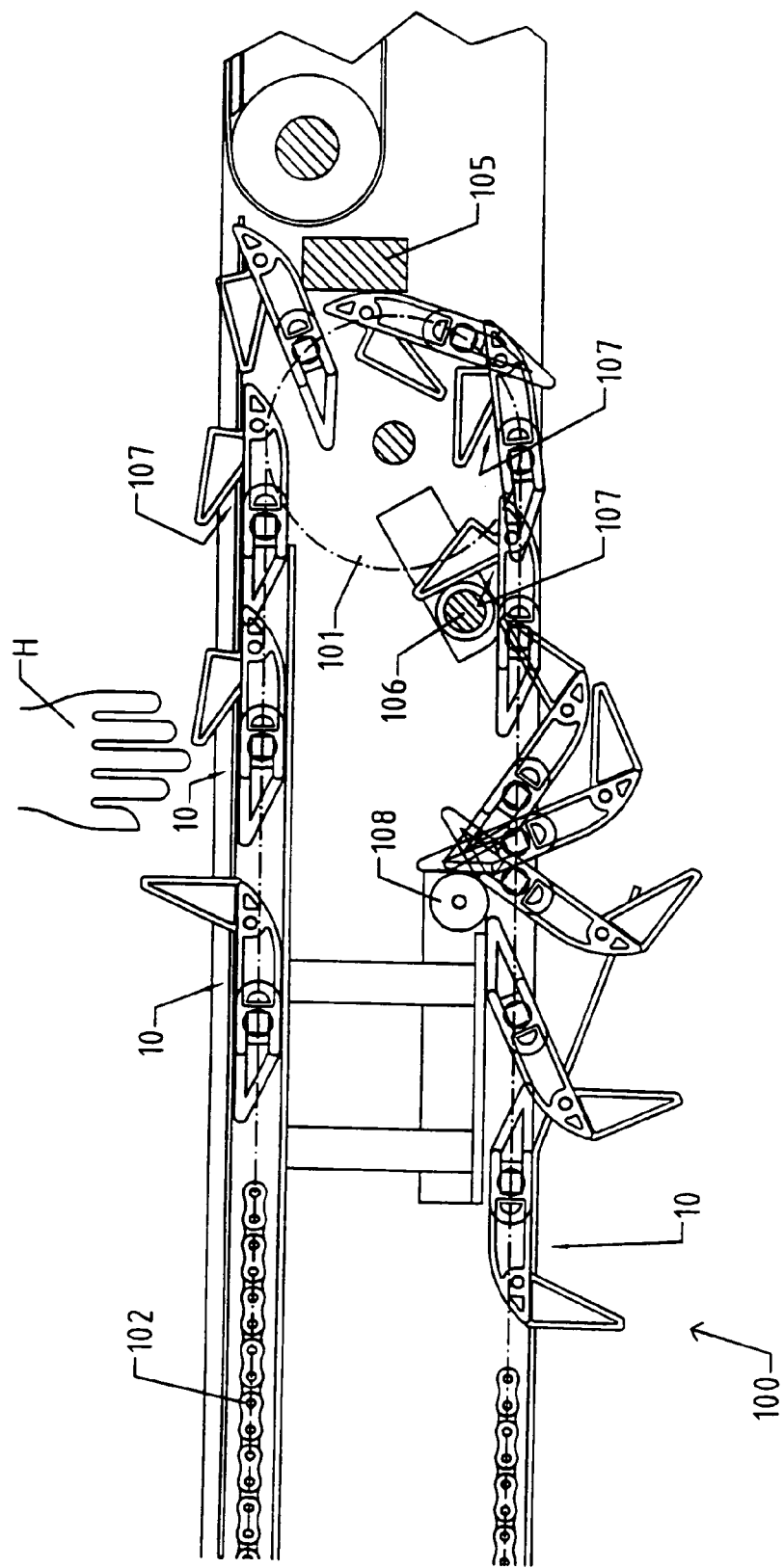

DRIVER, ESPECIALLY FOR USE IN COLLECTING AND PACKAGING MACHINES

BACKGROUND OF THE INVENTION

1. Field of the Invention

The invention relates to a driver, especially for use in collecting and packaging machines, that can be secured on a transport system.

2. Description of the Related Art

It is known that especially for the automated processing of paper products, for example, newspapers, flyers, advertisement brochures, patient information leaflets of medication packages or similar packages, drivers that are fastened to chains carry out the transport of the products in collecting and packaging machines. In different embodiments, these drivers are arranged fixedly or pivotably as a whole on chain members, for example, in order to be deflected at a turning point of a chain wheel by a lever arrangement. In all cases, the driver that is fastened on a chain or in a different way on a transport mechanism is a danger for the operating personnel operating such machines. Contusions and also severe cut injuries can occur when a person is caught with a body part, in particular, a hand, in the area of the driver circulating on the transport system. Such injuries have been counteracted in the past only by use of complex safety clutches with a forced shut-down of the running machine.

SUMMARY OF THE INVENTION

It is an object of the present invention to provide a driver of the aforementioned kind that upon overload, as it occurs, for example, when a driver impacts on a hand that is within the transport path, can evade the obstacle and, in this way, can reduce the risk of injury significantly, or even prevent it completely, without requiring the entire machine to be stopped.

In accordance with the present invention, this is achieved in that the driver has a base member that can be secured on a transport system and a drive lever that is pivotably arranged on the base member so as to pivot about a pivot bearing at least between a swung-out drive position and a folded safety position, wherein the driver comprises a spring element acting on the drive lever and securing the drive lever in the drive position by means of its spring force when the drive lever is in the drive position, but releases the drive lever for pivoting from the drive position into the safety position when a counterforce surpasses the spring force.

The driver is generally of a two-part configuration wherein a base member can be secured on a transport system of the machine, for example, on a chain or on mounting axles that extend between two chains or cables.

A drive lever is pivotably supported on the base member wherein the drive lever is pivotable at least between a swung-out drive position, in which the drive lever, when the driver is mounted on the transport system, is positioned transversely and preferably essentially perpendicularly to a transport direction and in which it can entrain material to be transported, for example, paper, and a folded safety position in which the drive lever, when the driver is mounted on the transport system, is essentially parallel to the transport direction and no longer projects transversely relative to the transport direction. In this way, when impacting on an obstacle, the drive lever that otherwise would represent a danger can be pivoted into the safety position in which it no longer presents a danger. Also, when transported material jams in the machine, the drive lever can pivot, and the machine and particularly the driver are not damaged by such a jam.

In order for the driver to be able to still transport a load and in order for the drive lever to be prevented from pivoting from the drive position into the safety position when exposed to minimal resistance, a spring element is provided that secures the drive lever in its drive position until a counterforce occurs that surpasses the spring force. The spring force is selected such that the drive lever can entrain the objects to be transported reliably but when encountering an obstacle, for example, the hand of an operator, can reliably pivot without creating an injury risk into the safety position against the spring force.

Advantageously, the spring element also secures the drive lever in position when it has been pivoted into the safety position. This prevents that the drive lever, once it has been pivoted, can pivot back prematurely out of the safety position and possibly can still present a danger for an operator. Only when a counterforce that surpasses the spring force is applied, the drive lever is pivoted back into the drive position, and it is secured in this position by means of the spring force of the spring element.

A further increase in safety results when the drive lever is pivotable against the spring force out of the safety position farther in a direction opposite to the drive position. In this way, a possibly still projecting last remainder of the drive lever can be pivoted without any danger out of the danger zone. A rebound of the drive lever is desirable out of such an over-pivoted position so that it can be erected again (even automatically).

A simple form of the pivotable support of the drive lever on the base member can be realized by an axle that penetrates both elements.

In order to reliably prevent over-pivoting of the drive lever out of the drive position in a direction opposite to the safety position, it is proposed that the base member and drive lever have stops surfaces which, in interaction with one another, provide a stop preventing such an over-pivoting.

According to a further embodiment, the base member has a groove in which a bearing section of the drive lever is received wherein the bearing section of the drive lever has a securing cam facing generally the bottom of the groove and wherein, as a spring means, a spring element engaging the securing cam is arranged at the bottom of the groove. This is a simple variant that is applicable for very different embodiments. When the securing cam is designed to have two flat cam surfaces that are separated from one another by rounded cam surfaces, wherein, when the drive lever is in the drive position or in the safety position, the spring element engages the two flat cam surfaces for securing the drive lever in its position, respectively, a springy securing action can be effected in a simple way in the two above mentioned positions of the drive lever. As a simple spring element, a spring tongue that is preferably a monolithic part of the base member was found to be expedient. Because of its monolithic configuration with the base member, it can be produced simply together with the base member; therefore, a separate assembly step for a separate spring element is eliminated.

The driver according to the invention can be realized particularly easily when the base member and/or the drive lever are made of plastic material. Plastic material can be easily formed to the desired parts by injection molding. The type of plastic material is selected in accordance with its properties based on the expected loads. It should be taken into account that the plastic material must be able to easily withstand wear caused by movement of the parts and by the other loads.

The driver is preferably embodied such that the base member has an elongate shape and, in the direction of its longest extension, is connected with a first end to the drive lever and, on the other opposed end, is provided with a fastening groove for fastening thereto an axle extending transversely to the transport direction, preferably a square axle, of a transport system, wherein in the area of the fastening groove openings are provided in the base member for introducing fastening elements for securing the base member on the axle. This embodiment has the advantage that the driver can be attached simply to a transport system. It is possible to secure two or more drivers on one axle so that by arrangement of an appropriate number of drivers the desired working width can be covered. The axles on which the drivers are arranged can be secured, for example, on transport chains that circulated about chain wheels. In order to ensure that the drivers safely contact turning levers or similar devices, particularly in transport systems where the drivers during one circulation are turned one or several times, the driver is embodied such that the first end of the base member tapers like a ship's bow along the elongate surface located opposite the drive lever projecting from the base member.

The driver according to another embodiment is configured such that the drive lever is substantially triangular in the effective area projecting from the base member and has a drive edge that extends essentially perpendicularly to the transport direction in the drive position, a rear edge that extends slantedly relative to the transport direction in the drive position, and a base edge that, in the drive position, rests against the base member, wherein in the safety position of the drive lever between the rear edge and the transport direction a wedge-shaped engagement space is formed for engagement of an erecting element for erecting the drive lever from the safety position into the drive position. This embodiment has the advantage that by means of the engagement space formed in the safety position between the rear edge and the transport direction an erecting element can be engaged that causes the folded driver to be erected (swung out) again. This erection is carried out, for example, at a turning point of the transport system.

BRIEF DESCRIPTION OF THE DRAWING

In the drawing:

FIG. 5 shows a plan view onto an axle of the transport system with two drivers arranged thereat;

FIG. 5A shows a section view according to the section line VA—VA in FIG. 5;

FIG. 5B shows a section view according to the section line VB—VB in FIG. 5; and FIG. 6 is a schematic illustration of an end section of a transport system with integrated driver according to the invention.

DESCRIPTION OF THE PREFERRED EMBODIMENTS

Figure 1:
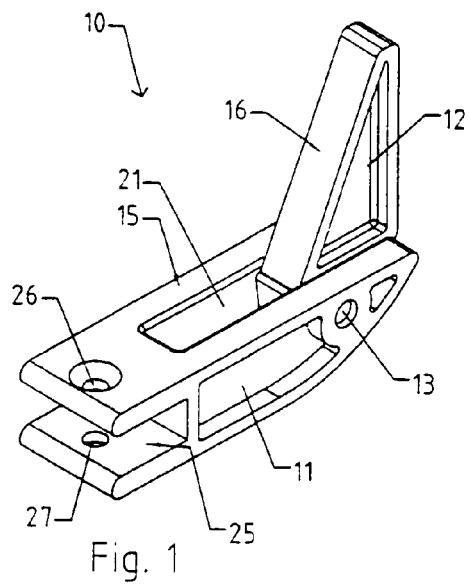
FIG. 1 shows the driver according to the invention in a perspective illustrations.

In the Figures, the same elements are identified with the same reference characters.

Figure 2:
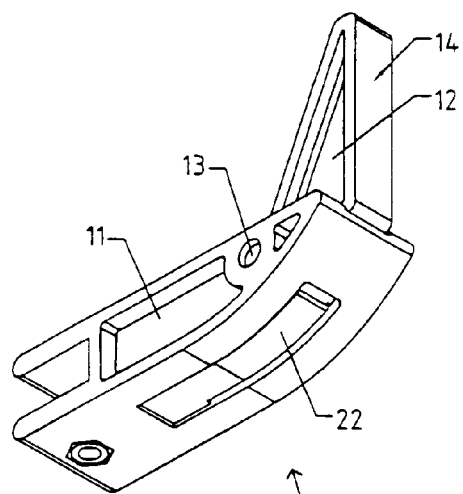
FIG. 2 shows the driver of FIG. 1 in a perspective bottom view.
Figure 3:
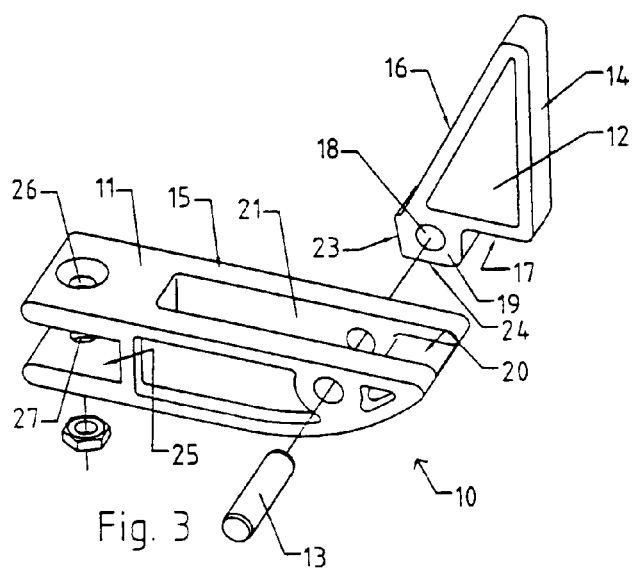
FIG. 3 shows the driver of FIG. 1 in a perspective exploded view.
Figure 4:
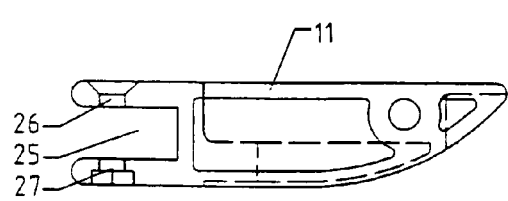
FIG. 4 shows the base member of the driver of FIG. 1 in a side view and a top view.

In FIGS. 1 through 3, the driver 10 according to the invention is illustrated in different views. The driver 10 is generally of a two-part configuration, i.e., a base member 11 and a drive lever 12 that are comprised of a suitable plastic material, respectively. The base member 11 is generally elongate wherein the direction of its longest extension, when the driver is mounted on an axle of the transport system, is essentially parallel to the transport direction. The drive lever 12 is essentially triangular having a drive edge 14, a rear edge 16, and a base edge 17 arranged within the triangle. The drive lever 12 is pivotably supported on the base member 11 by means of an axle 13. In this connection, the drive lever 12 can be pivoted between the drive position illustrated in FIGS. 1 and 2 in which it is positioned with its drive edge 14 essentially perpendicular to the surface 15 of the base member 11, and a safety position that is illustrated in FIG. 6 and is explained in more detail in connection with FIG. 6. The axle 13 extends through the opening 18 in the drive lever 12 which opening is positioned in the area of a securing cam 19 formed on the base edge 17. In the drive position illustrated in FIGS. 1 through 3, the leading section of the base edge 17 of the drive lever 12 positioned opposite the securing cam 19 forms a stop surface; this stop surface and a stop surface 20 formed on the base member 11 together form a stop that prevents over-pivoting of the drive lever 12.

In the base member 11 a groove 21 as formed in which the drive lever 12 is received. At the bottom of the groove 21, a spring tongue 22 is formed as a monolithic part of the base member 11; the spring tongue 22, when the driver 10 is in the mounted position, rests with its free end against the securing cam 19. The securing cam 19 is shaped such that it has substantially plane or flat retaining cam surfaces 23 and 24 on which the spring tongue 22 rests in the drive position of the drive lever 12 (retaining cam surface 24) and in the safety position of the drive lever 12 (retaining cam surfaces 23) while creating a spring force. The drive lever 12 is locked by the interaction of the spring tongue 22, on the one hand, and the securing cam 19, in particular, the retaining cam surfaces 23 and 24, on the other hand, in both afore mentioned base positions, i.e., the drive position and the safety position. It can be moved only by applying a counterforce that surpasses the spring force of the spring tongue 22 from one position into the other position. Inasmuch as the drive lever 12 is in an intermediate position between the aforementioned base positions, it is forcibly returned because of the shape of the securing cam 19 and the spring tongue 22 engaging it into one of the two base positions. The shape of the securing cam 19 enables also an easy over-pivoting of the drive lever 12 from the safety position in a direction opposite to the drive position (away from the drive position) wherein the drive lever 12, for reasons to be explained in more detail the following, is returned by the spring tongue 22 into the safety position in such a situation.

The leading end of the base element 11 where the drive lever 12 is supported tapers like a ship's bow at the side opposite the drive lever 12. This serves for an easy contacting of a turning beam on the transport system in which the driver 10 is used, as will be explained in more detail in the following in connection with FIG. 6. On the rear end that is positioned opposite the above described end, the base member 11 has a fastening groove 25 that extends transversely to its longitudinal extension and transversely to the main direction of extension of the drive lever 12 when in its drive position; this groove 25 has a rectangular cross-section. In an essentially perpendicular direction relative to the fastening groove 25, openings 26, 27 are provided in the adjoining surfaces of the base member 11 for passing fastening elements therethrough, for example, a screw/nut combination. In the illustrated embodiment, the openings 26, 27 are provided with recesses for receiving the head of a countersunk head screw or a nut.

In FIGS. 5 and 6, the driver 10 is integrated into a transport system 100, for example, a collecting or packaging machine used in paper processing. The transport system is configured as an endless system. The transport system 100 illustrated schematically in FIG. 6 in a detail view, contains two chains 102 that circulate on guide wheels 101 between which square axles 103 extend at a spacing to one another; the axles 103 are rotatably supported in the chains 102. Such a square axle 103 with drivers 10 and turning cams 104 arranged thereat is illustrated in FIGS. 5 through 5B. It is illustrated that in the shown transport mechanism 100 two adjacently arranged drivers 10 are fastened on a square axle 103.

FIG. 6 shows the end area of the transport system 100 where the articles to be transported are transferred onto a further machine section, for example, a transport belt. It is illustrated that on the upper run of the transport system 100, where the actual transport of articles is carried out, a hand H projects into the path of the drive levers 12. When the drivers 10 contact such an obstacle or when articles to be transported are backed up or jammed within the transport system, the drive lever 12 is moved counter to the spring force of the spring tongue out of the drive position (illustrated in FIG. 6 to the left) into the safety position (shown to the right in FIG. 6) in which it is pivoted into a position that is essentially parallel to the transport direction and in which it no longer projects or projects only minimally from the transport system; it is secured therein by interaction of the securing cam and the spring tongue. The drive lever in this way cannot cause any injury and cannot cause any machine damage in the case of a jam. This is true in particular also because after passing an obstacle the drive levers do not suddenly return into the drive position but are retained in the safety position until they are swung out of the safety position as will be described in the following.

In FIG. 6, further devices of the transport system 100 are shown that are required within the illustrated section. At the end of the transport path, in the area of the guide chain wheel 101, a turning beam 105 is arranged. The drivers 10 with the bow-shaped tapered end of their base member run against this beam, wherein the shape of the base member in interaction with the turning beam 105 causes a turning action of the driver 10 by rotation of the square axle 103. Turning of the drivers is realized so that they are guided "rearwardly" against the erecting axle 106 whose function will be explained in the following.

In the folded safety position, between the rear edge of the drive lever end the transport direction or the upper edge of the base member a generally wedge-shaped engagement space 107 is formed. With the "wedge opening" of this engagement space 107 in the leading position, the turned driver 10 is moved in the lower run of the transport system, where the return of the drivers 10 is realized, against the erecting axle 106 that has a circular cross-section. The erecting axle 106 pushes the drive lever at its rearward edge in the upward direction and erects it counter to the spring force of the spring tongue out of the safety position into the drive position in which it is secured again by the spring force of the spring tongue. In coordination with this step, a turning axle 108 is arranged downstream of the axle 106 in the transport system where, immediately after erection of the pivoted drive lever, the turning cams 104 will engage and, in cooperation with the turning axle 108, a new rotation of the square axle 103 and thus a turning of the driver 10 into a position is effected in which position they can again entrain articles once transferred again into the upper run. In normal operation, i.e., when the drive lever of the drivers 10 is not disturbed and not pivoted or folded into the safety position, the driver 10, as described above, is also turned twice but the described erection step is not carried out.

By means of the illustrated driver 10 the injury risk for the operating personnel is reduced significantly by simple means without having to employ a forced shutdown that would impede the course of the production. In the case of a backup or jam of articles to be transported, the disclosed improvements also have an effect in that damage to the machine is also prevented simply and reliably.

While specific embodiments of the invention have been shown and described in detail to illustrate the inventive principles, it will be understood that the invention may be embodied otherwise without departing from such principles.

What is claimed is:

1. A driver for use in collecting and packaging machines, the driver comprising:
   a base member securable on a transport system;
   a drive lever including a drive edge arranged pivotably on the base member so as to pivot at least between a swung-out drive position and a folded safety position;
   a spring element acting on the drive lever;
   wherein the spring element, in the drive position of the drive lever, secures by a spring force the drive lever in the drive position but releases the drive lever, when a first counterforce surpassing the spring force acts on the drive lever, for pivoting the drive lever from the drive position into the safety position, wherein the drive lever is substantially triangular in an effective area projecting from the base member, the drive lever comprising the drive edge extending essentially perpendicularly to a transport direction in the drive position, a rear edge extending slantedly relative to the transport direction in the drive position, and a base edge that, in the drive position, rests against the base member, wherein, in the safety position of the drive lever a wedge-shaped engagement space is formed between the rear edge and the transport direction adapted for engaging an erecting element for erecting the drive lever from the safety position into the drive position.

2. The driver according to claim 1, wherein the spring element acts with the spring force on the drive lever also in the safety position, wherein, when a second counterforce surpassing the spring force acts on the drive lever, the drive lever is mounted so as to be pivoted from the safety position into the drive position and is secured in the drive position by the spring force.

3. The driver according to claim 2, wherein the drive lever is pivotable past the safety position in a direction away from the drive position, wherein the spring element is mounted so as to force the drive lever back into the safety position by the spring force exerted by the spring element.

4. The driver according to claim 1, wherein the base member and the drive lever each have a stop surface interacting with one another to form a stop preventing over-pivoting of the drive lever in the drive position.

5. The driver according to claim 1, further comprising a pivot axle penetrating the drive lever and the base member, wherein the drive lever has a bearing section that is pivotably supported on the pivot axle, wherein the base member has a groove and the bearing section is arranged in the groove, wherein the bearing section has a securing cam that faces a bottom of the groove and wherein the spring element is arranged on the bottom of the groove and engages the securing cam.

6. The driver according to claim 5, wherein the securing cam has two flat cam surfaces separated from one another by rounded cam surfaces, wherein, in the drive position or in the safety position of the drive lever, the spring element engages one of the two flat cam surfaces, respectively, for securing the drive lever in one of the drive position and the safety position.

7. The driver according to claim 5, wherein the spring element is a spring tongue.

8. The driver according to claim 7, wherein the spring tongue is formed as a monolithic part of the base member.

9. The driver according to claim 1, wherein the base member has an elongate shape and, in a direction of a longest extension of the base member, has a first end connected to the drive lever and a second end opposite the first end provided with a fastening groove for receiving an axle of a transport system, wherein the axle extends transversely to a transport direction of the transport system, wherein the base member in the area of the fastening groove has openings for receiving fastening elements for fastening the base member on the axle.

10. The driver according to claim 9, wherein the axle has a square cross-section.

11. The driver according to claim 8, wherein the first end of the base member tapers in the shape of a ship's bow along a longitudinal surface positioned opposite the drive lever that projects from the base member.

* * * * *